US011422708B2

(12) United States Patent
Yun

(10) Patent No.: US 11,422,708 B2

(45) Date of Patent: Aug. 23, 2022

(54) MEMORY INTERFACE, DATA STORAGE DEVICE INCLUDING THE SAME AND OPERATING METHOD THEREOF

(71) Applicant: SK hynix Inc., Gyeonggi-do (KR)

(72) Inventor: Ho Jung Yun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 216 days.

(21) Appl. No.: 16/689,781

(22) Filed: Nov. 20, 2019

(65) Prior Publication Data

US 2021/0004164 A1 Jan. 7, 2021

(30) Foreign Application Priority Data

Jul. 5, 2019 (KR) ........................ 10-2019-0081290

(51) Int. Cl.
*G06F 3/06* (2006.01)

(52) U.S. Cl.
CPC .......... *G06F 3/0613* (2013.01); *G06F 3/0625* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS 7,325,104 B2 * 1/2008 Satori .................... G06F 3/0679 711/150
8,331,124 B2 * 12/2012 Nakamura ........... G11C 7/1051 365/63
10,754,560 B2 * 8/2020 Matsuyama .......... G06F 3/0659

FOREIGN PATENT DOCUMENTS

KR 10-1764044 8/2017
KR 10-2018-0074138 7/2018

* cited by examiner

*Primary Examiner* — Idriss N Alrobaye
*Assistant Examiner* — Dayton Lewis-Taylor
(74) *Attorney, Agent, or Firm* — IP & T Group LLP

(57) ABSTRACT

A memory interface may include: a transceiver module configured to exchange signals with a plurality of dies; and an input/output (I/O) rate controller configured to calculate per-signal-interval ratios of each of the dies by monitoring signals transmitted to, and received from, each of the dies, select a first die whose operating time is relatively slow and a second die whose operating time is relatively fast, among the plurality of dies, using the calculated per-signal-interval ratios, and provide the transceiver module with information for adjusting data interval ratios for each of the first and second dies.

21 Claims, 12 Drawing Sheets

S1010 Receive monitoring start signal for monitoring signal transmission states of memory chips S1020 Monitor signal transmission states for memory chips S1030 Is monitoring restart signal received?

Yes

S1040 Reset monitored signal transmission states

No

S1050 Is monitoring end signal received?

No

Yes

S1060 Calculate per-signal interval ratios for each of memory chips, based on monitoring result S1070 Sort memory chips according to operation interval ratios S1080 Adjust data transfer rates for first memory chip in which operation interval ratios is relatively high and second memory chip in which operation interval ratios is relatively low I/O monitoring setting register

| Start | End | Re-start | Counting Unit |
|---|---|---|---|
| Set/Reset | Set/Reset | Set/Reset | The number of clock cycles |

MEMORY INTERFACE, DATA STORAGE DEVICE INCLUDING THE SAME AND OPERATING METHOD THEREOF

CROSS-REFERENCE TO RELATED APPLICATION

The present application claims priority under 35 U.S.C. § 119(a) to Korean application number 10-2019-0081290, filed on Jul. 5, 2019, in the Korean Intellectual Property Office, which is incorporated herein by reference in its entirety.

BACKGROUND

1. Technical Field

Various embodiments generally relate to an electronic device, and more particularly, to a memory interface, a data storage device including the same and an operating method thereof.

2. Related Art

Recently, the paradigm for the computing environment has changed to the ubiquitous computing environment in which computer systems can be used anytime and anywhere. Therefore, the use of portable electronic devices such as mobile phones, digital cameras and notebook computers has rapidly increased. Such portable electronic devices generally use a data storage device using a memory device. The data storage device is used to store data which are used in the portable electronic devices.

Since a data storage device using a memory device has no mechanical driver, the data storage device has excellent stability and durability, high information access speed, and low power consumption. A data storage device having such advantages includes a universal serial bus (USB) memory device, a memory card having various interfaces, a universal flash storage (UFS) device, and a solid state drive (SSD).

SUMMARY

Various embodiments are directed to a memory interface which can balance performances of dies having different operating times, a data storage device including the same and an operating method thereof.

Also, various embodiments are directed to a memory interface which can prevent performance degradation duo to a power shortage, a data storage device including the same and an operating method thereof.

In an embodiment, a memory interface may include: a transceiver module configured to exchange signals with a plurality of dies; and an input/output (I/O) rate controller configured to calculate per-signal-interval ratios of each of the dies by monitoring signals transmitted to, and received from, each of the dies, select a first die whose operating time is relatively slow and a second die whose operating time is relatively fast, among the plurality of dies, using the calculated per-signal-interval ratios, and provide the transceiver module with information for adjusting data interval ratios for each of the first and second dies.

In an embodiment, a data storage device may include: a nonvolatile memory device including a plurality of memory chip; and a controller configured to calculate per-signal-interval ratios of each of the memory chips by monitoring signals transmitted to, and received from, the plurality of memory chips, respectively, select a first memory chip whose operating time is the slowest and a second memory chip whose operating time is the fastest, among the plurality of memory chips, using the calculated per-signal-interval ratios, and adjusts data interval ratios for each of the first and second memory chips.

In an embodiment, there is provided an operating method of a data storage device which includes a controller and a nonvolatile memory device including a plurality of memory chips. The operating method may include: monitoring signals transmitted to, and received from, the plurality of memory chips, respectively; calculating per-signal-interval ratios for each of the memory chips, using the monitored signals; selecting a first memory chip whose operating time is the slowest and a second memory chip whose operating time is the fastest, among the plurality of memory chips, using the calculated per-signal-interval ratios; and adjusting data interval ratios for each of the first and second memory chips.

The adjusting of the data interval ratios is performed by increasing data transfer rate for the first memory chip and decreasing data transfer rate for the second memory chip.

The operating method may further include receiving a monitoring start signal for monitoring the signals transmitted to, and received from, the respective memory chips. The monitoring of the signals is performed when the monitoring start signal is received.

The operating method may further include determining whether a monitoring end signal for ending the monitoring of the signals transmitted to, and received from, the respective memory chips is received. The calculating of the per-signal-interval ratios is performed when the monitoring end signal is received.

The operating method may further include determining whether a monitoring restart signal for restarting monitoring the signals transmitted to/received from the respective memory chips is received; resetting the signals monitored for the respective memory chips, when the monitoring restart signal is received; and monitoring signals transmitted to, and received from, the respective memory chips again.

In an embodiment, there is provided an operating method of a controller for controlling a memory device including plural chips operably coupled to the controller through respective channels. The operating method may include: identifying busy intervals of the respective chips by snooping signals transferred through the channels for a set time interval; and performing a signal transfer rate adjusting operation of increasing a signal transfer rate of a first channel and decreasing a signal transfer rate of a second channel, among the channels. The first channel corresponds to a chip having a relatively long busy interval and the second channel corresponds to a chip having a relatively short busy interval, among the chips.

DETAILED DESCRIPTION

Embodiments of a memory interface, a data storage device including the same and an operating method thereof are described below with reference to the accompanying drawings. Throughout the specification, reference to "an embodiment" or the like is not necessarily to only one embodiment, and different references to any such phrase are not necessarily to the same embodiment(s).

Figure 1:
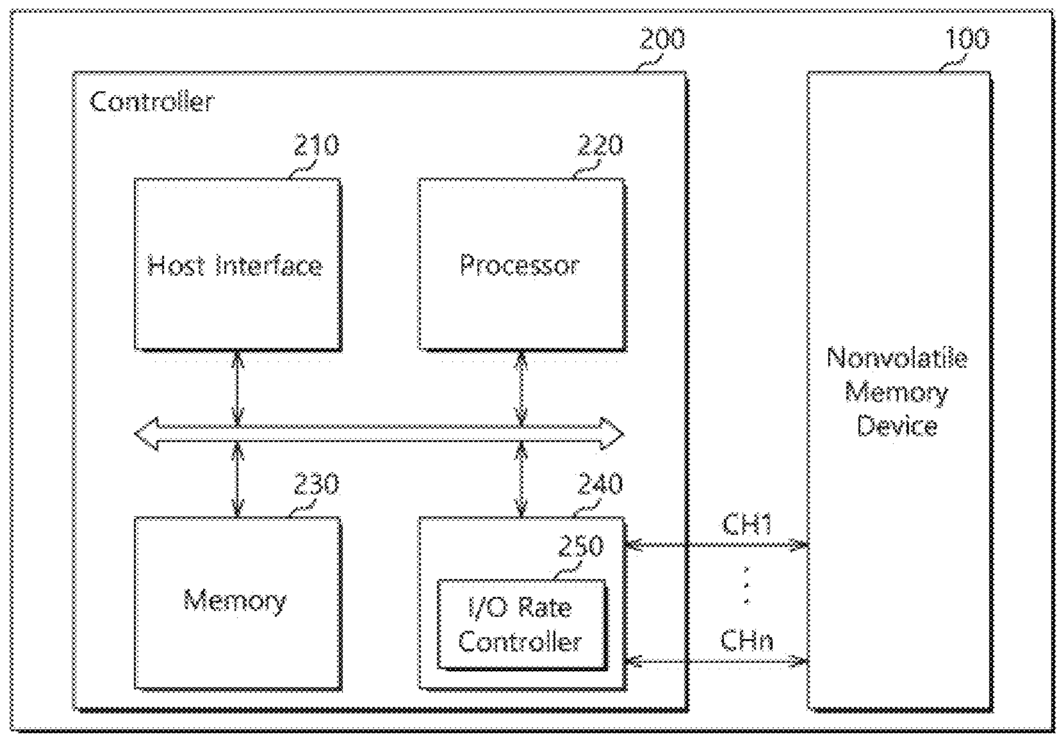
FIG. 1 is a diagram illustrating a data storage device in accordance with an embodiment.

FIG. 1 illustrates a configuration of a data storage device 10 in accordance with an embodiment.

Referring to FIG. 1, the data storage device 10 may store data accessed by a host (not illustrated) such as a mobile phone, MP3 player, laptop computer, desktop computer, game machine, TV or in-vehicle infotainment system. The data storage device 10 may be referred to as a memory system.

The data storage device 10 may be fabricated as any of various types of storage devices according to an interface protocol coupled to the host. For example, the data storage device 10 may be configured as any of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Storage Bus) storage device, a UFS (Universal Flash Storage) device, a PCMCIA (Personal Computer Memory Card International Association) card-type storage device, a PCI (Peripheral Component Interconnection) card-type storage device, a PCI-e (PCI Express) card-type storage device, a CF (Compact Flash) card, a smart media card and a memory stick.

The data storage device 10 may be fabricated as any of various types of packages. For example, the data storage device 10 may be fabricated as any of various types of packages such as a POP (Package-On-Package), SIP (System-In-Package), SOC (System-On-Chip), MCP (Multi-Chip Package), COB (Chip-On-Board), WFP (Wafer-Level Fabricated Package) and WSP (Wafer-Level Stack Package).

The data storage device 10 may include a nonvolatile memory device 100 and a controller 200.

The nonvolatile memory device 100 may operate as a storage medium of the data storage device 10. The nonvolatile memory device 100 may be configured as any of various types of nonvolatile memories such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and ReRAM (Resistive Random Access Memory) using transition metal oxide, depending on memory cells.

The nonvolatile memory device 100 may include a memory cell array (not illustrated) having a plurality of memory cells arranged at the respective intersections between a plurality of bit lines (not illustrated) and a plurality of word lines (not illustrated). For example, each of the memory cells of the memory cell array may be a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array 110 may include one or more SLCs, MLCs, TLCs and/or QLCs. For example, the memory cell array 110 may include memory cells with a two-dimensional horizontal structure or memory cells with a three-dimensional vertical structure.

The controller 200 may control overall operations of the data storage device 10 by driving firmware or software loaded to the memory 230. The controller 200 may decode and drive a code-based instruction or algorithm such as firmware or software. The controller 200 may be implemented in hardware or a combination of hardware and software.

The controller 200 may include a host interface 210, a processor 220, a memory 230 and a memory interface 240. The memory interface 240 may include an input/output (I/O) rate controller 250. Although not illustrated in FIG. 1, the controller 200 may further include an error correction code (ECC) engine which generates parity data by performing ECC encoding on write data provided from a host, and performs ECC decoding on data read from the nonvolatile memory device 100 using the parity data. The eCC engine may be installed within or externally to the memory interface 240.

The host interface 210 may interface the host and the data storage device 10 in response to a protocol of the host. For example, the host interface 210 may communicate with the host through any of various protocols including USB (Universal Serial Bus), UFS (Universal Flash Storage), MMC (Multimedia Card), PATA (Parallel Advanced Technology Attachment), SATA (Serial Advanced Technology Attachment), SCSI (Small Computer System Interface), SAS (Serial Attached SCSI), PCI (Peripheral Component Interconnection) and/or PCI-e (PCI express).

The processor 220 may include a micro control unit (MCU) and/or a central processing unit (CPU). The processor 220 may process a request transmitted from the host. In order to process the request transmitted from the host, the processor 220 may drive a code-based instruction or algorithm loaded to the memory 230, i.e. firmware, and control operations of the nonvolatile memory device 100 and internal devices such as the host interface 210, the memory 230 and the memory interface 240.

The processor 220 may generate control signals for controlling an operation of the nonvolatile memory device 100, based on requests transmitted from the host, and provide the generated control signals to the nonvolatile memory device 100 through the memory interface 240.

The RAM 230 may include a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220. Although not illustrated in FIG. 1, the controller 200 may further include a processor-dedicated memory disposed adjacent to the processor 220, and firmware and meta data stored in the memory 230 may be loaded to the processor-dedicated memory.

The memory 230 may include a buffer for temporarily storing write data to be transmitted to the nonvolatile memory device 100 from the host or read data to be transmitted to the host from the nonvolatile memory device 100. That is, the memory 230 may operate as a buffer memory.

FIG. 1 illustrates that the memory 230 is installed in the controller 200, but the memory 230 may be installed externally to the controller 200.

The memory interface 240 may control the nonvolatile memory device 100 under control of the processor 220. When the nonvolatile memory device 100 is configured as a NAND flash memory, the memory interface 240 may be referred to as a flash control top (FCT). The memory interface 240 may transmit the control signals generated by the processor 220 to the nonvolatile memory device 100. The control signals may include a command, an address and an operation control signal for controlling an operation of the nonvolatile memory device 100. The operation control signal may include a chip enable signal, a command latch enable signal, an address latch enable signal, a write enable signal, a read enable signal, a data storage signal and the like, for example, but is not specifically limited thereto. The memory interface 240 may provide write data to the nonvolatile memory device 100, or receive read data from the nonvolatile memory device 100.

The memory interface 240 and the nonvolatile memory device 100 may be coupled through a plurality of channels CH1 and CHn. The memory interface 240 may transmit signals such as a command, an address, an operation control signal and data (i.e., write data) to the nonvolatile memory device 100 through the plurality of channels CH1 and CHn. Furthermore, the memory interface 240 may receive a status signal (for example, ready/busy) and data (i.e., read data) from the nonvolatile memory device 100 through the plurality of channels CH1 to CHn.

Figure 2:
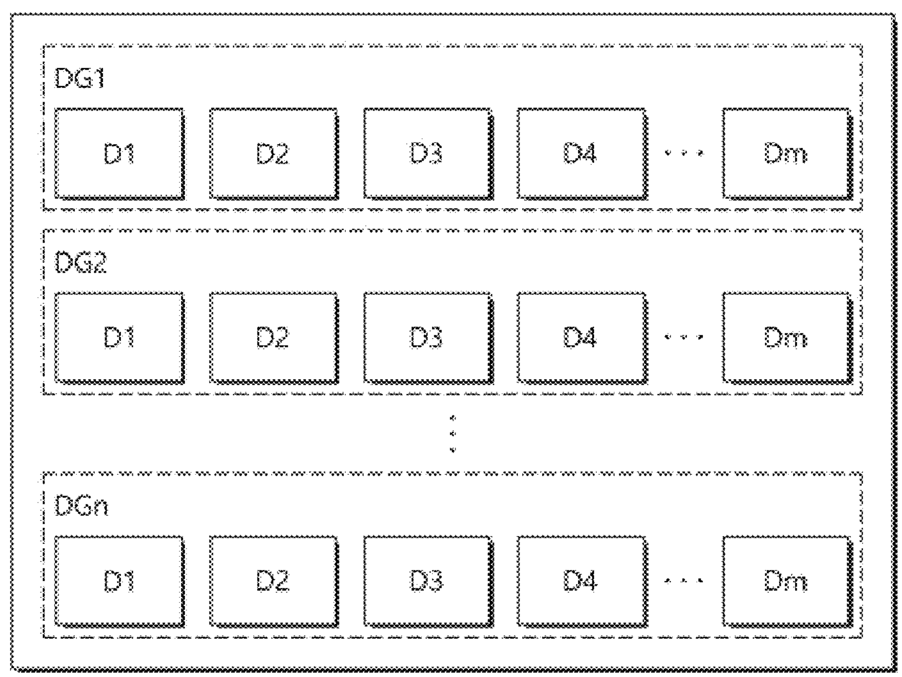
FIG. 2 is a diagram illustrating a configuration of a nonvolatile memory device of FIG. 1.

FIG. 2 is a diagram schematically illustrating a configuration of the nonvolatile memory device 100 of FIG. 1.

Referring to FIG. 2, the nonvolatile memory device 100 may include a plurality of die groups DG1 to DGn each having a plurality of dies D1 to Dm. Although not illustrated in FIG. 2, each of the dies D1 to Dm may include one or more planes. Each of the one or more planes may include a plurality of blocks (or memory blocks), and each of the blocks may include a plurality of pages.

The number of the channels through which the memory interface 240 and the nonvolatile memory device 100 are coupled may be equal to the number of the die groups included in the nonvolatile memory device 100. For example, as illustrated in FIG. 2, when the number of the die groups DG1 to DGn included in the nonvolatile memory device 100 is n, the n channels CH1 to CHn may be installed to couple the respective n die groups DG1 to DGn to the memory interface 240.

Although not illustrated in FIG. 2, each of the channels CH1 to CHn coupled to the respective die groups DG1 to DGn may be shared by the plurality of dies D1 to Dm in the corresponding die group. That is, a plurality of dies Dx in one die group DGx may be coupled to the memory interface 240 through one channel. A single die described as being coupled to the memory interface 240 through a single channel may also represent a plurality of dies Dx in a die group DGx coupled to the memory interface 240 through a single channel.

Figure 3:
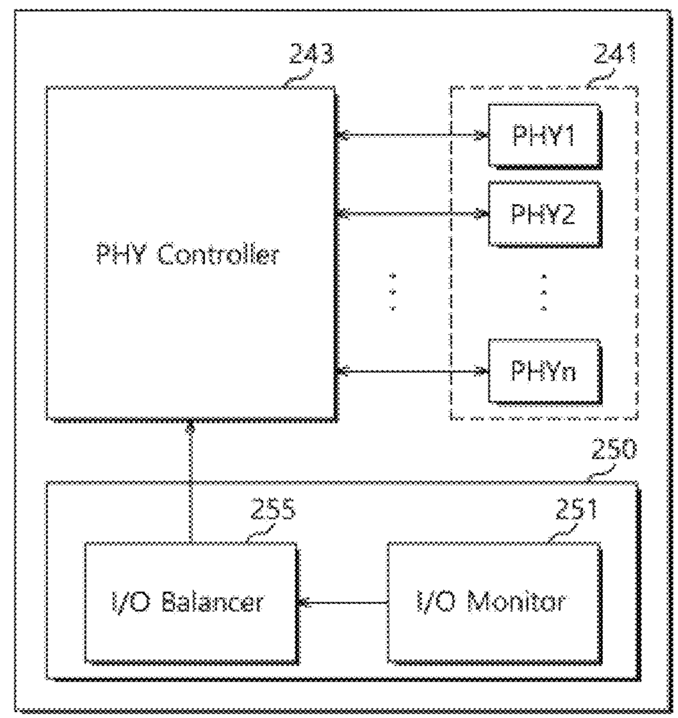
FIG. 3 is a diagram illustrating a configuration of a memory interface in accordance with an embodiment.

FIG. 3 is a diagram illustrating a configuration of the memory interface 240 in accordance with an embodiment.

Referring to FIG. 3, the memory interface 240 may include a physical layer array 241 including a plurality of physical layers PHY1 to PHYn, a PHY controller 243 and an I/O rate controller 250. The physical layer array 241 and the PHY controller 243 may be collectively referred to as a transceiver module.

The physical layers PHY1 to PHYn may transmit signals, such as commands, addresses, operation control signals and data, to the corresponding die groups DG1 to DGn (see FIG. 2). The physical layers PHY1 to PHYn may receive signals such as status signals and data, which are transmitted from the corresponding die groups DG1 to DGn.

The PHY controller 243 may provide the physical layers PHY1 to PHYn with a control signal for controlling the operating speeds of the respective physical layers PHY1 to PHYn. Each of the physical layers PHY1 to PHYn may operate according to the control signal provided from the PHY controller 243. For example, the physical layers PHY1 to PHYn may transmit signals to the corresponding die groups DG1 to DGn or receive signals from the corresponding die groups DG1 to DGn, according to the control signal provided from the PHY controller 243. Furthermore, the speed at which signals are transmitted between the physical layers PHY1 and PHYn and the corresponding die groups DG1 to DGn, i.e. a clock frequency (or clock speed), may be adjusted by the control signal of the PHY controller 243.

The I/O rate controller 250 may include an I/O monitor 251 and an I/O balancer 255.

The I/O monitor 251 may be configured to monitor per-signal-interval clock counts transmitted between the physical layers PHY1 to PHYn and the corresponding die groups DG1 to DGn.

In the present embodiment, the signal interval may indicate an interval in which the same type of signals are transmitted. For example, the signal interval may include a command transmission interval in which a command is transmitted from a physical layer (generically PHY) to the corresponding die group, an address transmission interval in which an address is transmitted from a PHY to the corresponding die group, a data input interval in which data is transmitted from a PHY to the corresponding die group, a ready/busy interval in which a status signal is transmitted from a die group to the corresponding PHY, and a data output interval in which data is transmitted from a die group to the corresponding PHY, but is not specifically limited thereto. In the present embodiment, the signal interval may further include an idle interval in which no signals are transmitted between a PHY and a die group. Furthermore, in the present embodiment, the per-signal-interval clock count may indicate the time for which the same types of signals are transmitted.

In the present embodiment, the I/O monitor 251 may monitor the per-signal-interval clock counts based on a clock (for example, monitoring clock) provided for I/O monitoring. In an embodiment, the I/O monitor 251 may monitor per-signal-interval times or lengths according to a set counting unit. The counting unit may include one or more clock cycles.

The I/O monitor 251 may calculate per-signal-interval ratios using the entire monitoring time (or the entire monitoring clock count) and the per-signal-interval times (or the per-signal-interval clock counts), and provide the calculated per-signal-interval ratios to the I/O balancer 255.

The I/O balancer 255 may select a die whose operating time is the slowest (for example, a first die) and a die whose operating time is the fastest (for example, a second die), based on the per-signal-interval ratios provided from the I/O monitor 251, and provide the PHY controller 243 with information on PHYs to which the selected first and second dies are coupled. Among the per-signal-interval ratios for each of the dies respectively coupled to the channels, the die whose operating time is the slowest may indicate the die in which the busy interval ratio is the highest. On the other hand, the die whose operating time is the fastest may indicate the die in which the busy interval ratio is the lowest.

The PHY controller 243 may generate a control signal for changing a clock frequency of the PHY coupled to the first die and a clock frequency of the PHY coupled to the second die, based on the information provided from the I/O balancer 255, and provide the generated control signal to the corresponding PHYs. For example, the PHY controller 243 may provide the control signal for increasing the clock frequency to the PHY coupled to the first die, in order to raise a data transfer rate for the first die. Furthermore, the PHY controller 243 may provide the control signal for decreasing the clock frequency to the PHY coupled to the second die, in order to lower a data transfer rate for the second die.

Figure 4:
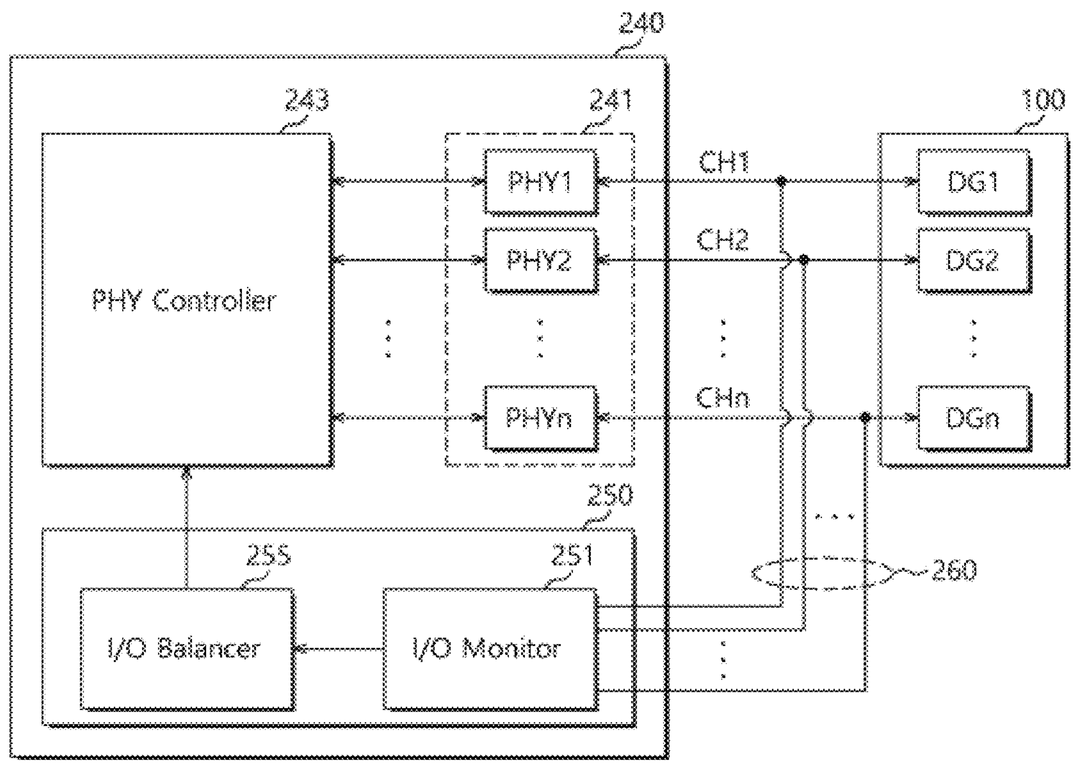
FIG. 4 is a diagram illustrating a coupling relationship between a memory interface and a nonvolatile memory device.

FIG. 4 is a diagram illustrating the coupling relationship between the memory interface 240 and the nonvolatile memory device 100.

Referring to FIG. 4, the plurality of physical layers PHY1 to PHYn may be coupled to the corresponding die groups DG1 to DGn of the nonvolatile memory device 100 through the corresponding channels CH1 to CHn. The I/O monitor 251 of the I/O rate controller 250 and the channels CH1 to CHn may be physically coupled through separate monitoring lines 260, and the I/O monitor 251 may monitor signals inputted to/outputted from the respective channels CH1 to CHn through the monitoring lines 260.

Figure 5:
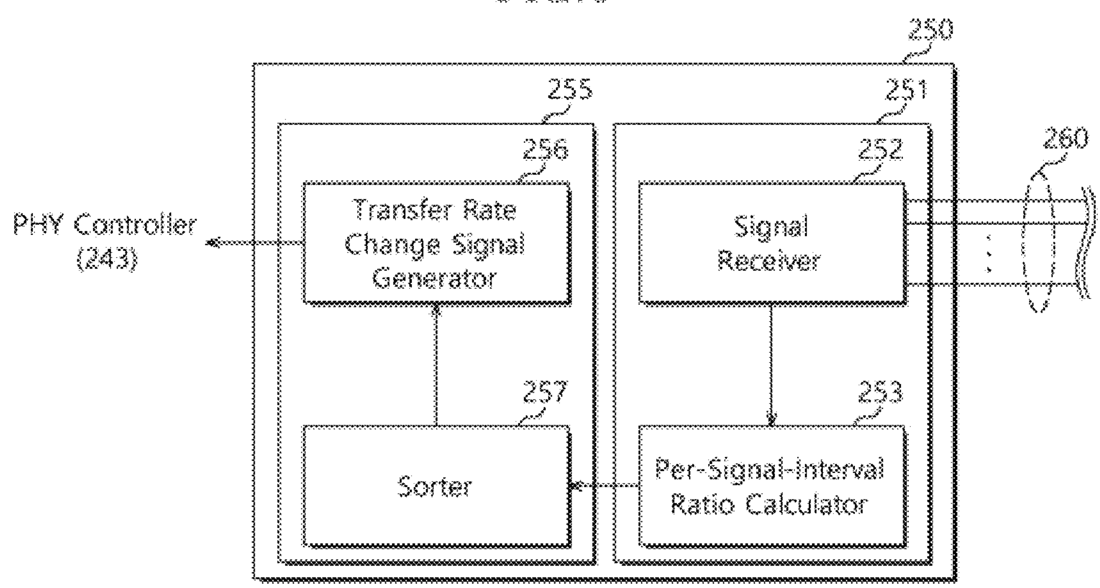
FIG. 5 is a diagram illustrating a configuration of an I/O rate controller in accordance with an embodiment.

FIG. 5 is a diagram illustrating the configuration of the I/O rate controller 250 in accordance with an embodiment.

Referring to FIG. 5, the I/O monitor 251 may include a signal receiver 252 and a per-signal-interval ratio calculator 253. The signal receiver 252 may snoop or detect signals transferred on the respective channels CH1 to CHn through the monitoring lines 260 illustrated in FIG. 4. The signal receiver 252 may provide the received signals to the per-signal-interval ratio calculator 253.

The per-signal-interval ratio calculator 253 may divide signals provided from the signal receiver 252 into a plurality of signal intervals, and calculate per-signal-interval ratios using the entire monitoring time (or the entire monitoring clock count) and per-signal-interval transmission times (or per-signal-interval clock counts). In the present embodiment, the plurality of signal intervals may include an idle interval, a command transmission interval including an address transmission interval, a data transmission (input/output) interval, a busy interval and the like. However, the present invention is not limited thereto. Rather, the plurality of signal intervals may include more intervals or fewer intervals depending on design and necessity. The busy interval may indicate the interval in which an operation corresponding to a command is performed in a die.

The per-signal-interval ratio calculator 253 may calculate the per-signal-interval ratios by dividing the transmission times of the plurality of signal intervals by the entire monitoring time. The per-signal-interval ratio calculator 253 may provide the calculated per-signal-interval ratios to a sorter 257 of the I/O balancer 255. The per-signal-interval ratios provided to the sorter 257 from the per-signal-interval ratio calculator 253 may be per-signal-interval ratios for each of all or some of the plurality of dies D1 to Dm in the die groups DG1 to DGn respectively coupled to the channels CH1 to CHn.

The sorter 257 of the I/O balancer 255 may sort the plurality of dies D1 to Dm in ascending or descending order according to the busy interval ratio among the per-signal-interval ratios provided from the per-signal-interval ratio calculator 253 of the I/O monitor 251. The I/O balancer 255 may select the first die having the longest busy interval and the second die having the shortest busy interval, among the plurality of dies D1 to Dm sorted in ascending or descending order, and provide a transfer rate change signal generator 256 with information on the PHYs coupled to the selected first and second dies, respectively.

The transfer rate change signal generator 256 may generate a transfer rate change signal including information on PHYs whose transfer rates are to be changed according to the information provided from the sorter 257 and provide the generated transfer rate change signal to the PHY controller 243. The PHY controller 243 may change the clock frequencies of the PHY corresponding to the channel coupled to the first die and the PHY corresponding to the channel coupled to the second die according to the transfer rate change signal provided from the transfer rate change signal generator 256 of the I/O balancer 255. In the present embodiment, the transfer rate change signal may indicate a signal for changing a data transfer (I/O) rate. That is, the PHY controller 243 may increase the clock frequency of the PHY corresponding to the first die to increase the data transfer rate for the first die, and decrease the clock frequency of the PHY corresponding to the second die to decrease the data transfer rate for the second die. Therefore, the operation performance of the first die and the operation performance of the second die may be balanced.

In the present embodiment, it has been described that each of the data interval ratios of the die whose operating time is the slowest (first die) and the die whose operating time is the fastest (second die), among the plurality of dies, is adjusted to balance the operation performance. However, the present invention is not specifically limited thereto. Rather, data transfer rates for the plurality of dies may be all adjusted to balance the operation performances of all the dies. For example, each of the clock frequencies of all the PHYs coupled to the plurality of dies may be adjusted according to the busy interval ratio in the corresponding die, which makes it possible to balance the operation performances of the plurality of dies.

The plurality of dies D1 to Dm included in the nonvolatile memory device 100 may have different operating times depending on wafer characteristics at the fabrication step. Furthermore, as memory cells are damaged by lapse of usage time, the variance of the operating times of the respective dies D1 to Dm increases. The controller 200 for controlling the operation of the nonvolatile memory device 100 cannot detect such changes of the respective dies D1 to Dm in real time, and applies the same operation condition to all of the dies D1 to Dm. Therefore, the performance of the data storage device 10 is adjusted to the die having the lowest performance, i.e. the die whose operating speed is the lowest, among the plurality of dies D1 to Dm. As a result, the performance of the data storage device 10 may be lowered as a whole. When the performance of the data storage device 10 is adjusted to the die whose operating speed is the lowest, it may indicate that, since the data storage device 10 provides data to the host after the controller 200 receives the data from all of the dies in which data to be provided to the host are stored, the host determines that the performance of the die which transfers data for the last time is the performance of the data storage device 10.

Therefore, in the preset embodiment, the data storage device 10 can acquire the per-signal-interval ratios of respective dies by monitoring signals transmitted between the plurality of PHYs and the corresponding die group, and balance the performances of the dies by adjusting the data transfer (I/O) rate ratio of the die whose operating time is the slowest and the die whose operating time is the fastest, based on the acquired per-signal-interval ratios, thereby improving the performance of the data storage device 10 as a whole.

Figures 6, 7:
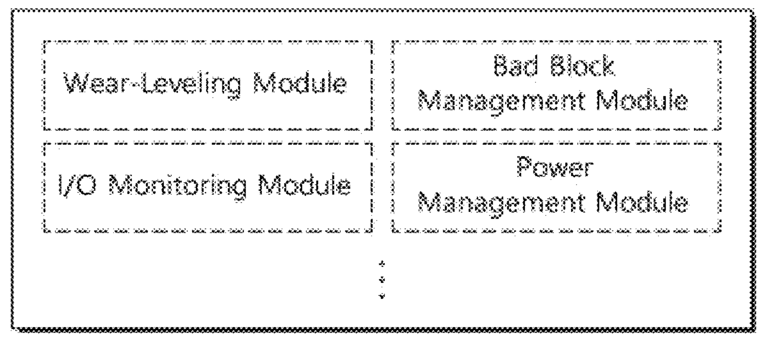
FIG. 6 is a diagram schematically illustrating a flash translation layer (FTL) in accordance with an embodiment.
FIG. 7 is a diagram illustrating an input/output (IC)) monitoring setting register in accordance with an embodiment.

FIG. 6 is a diagram conceptually illustrating a flash translation layer (FTL).

The FTL may be stored in the memory 230. The FTL may be software driven by the processor 220. The processor 220 may drive the FTL to control a unique operation of the nonvolatile memory device 100, and provide device compatibility to the host. As the FTL is driven, the host may recognize and use the data storage device 10 as a general storage device such as a hard disk. The FTL may include modules for performing various functions.

The FTL may be stored in a system region (not illustrated) of the nonvolatile memory device 100. While the data storage device 10 is booted up, the FTL may be read from the system region of the nonvolatile memory device 100 and stored in the memory 230. Furthermore, meta data required for driving various modules included in the FTL may be stored in the memory 230.

Referring to FIG. 6, the FTL may include a wear-leveling module WLM, a bad block management module BBM, an I/O monitoring module IOM, a power management module PMM and the like. However, the present invention is not limited thereto. Rather, the FTL may include various other function modules. For example, the FTL may further include a read module, a write module, a garbage collection module, an address map and the like. The function modules included in the FTL may be executed by control of the processor 220.

The I/O monitoring module TOM may control the operation of the I/O rate controller 250 illustrated in FIG. 1. For example, the I/O monitoring module TOM may provide the I/O rate controller 250 with the counting unit and a monitoring start signal for instructing the I/O monitor 251 to start monitoring. The I/O monitor 251 of the I/O rate controller 250 may start monitoring signals transmitted between the PHYs and the nonvolatile memory device 100 according to the monitoring start signal provided from the I/O monitoring module IOM. Furthermore, the I/O monitor 251 may divide the signals transmitted between the PHYs and the nonvolatile memory device 100 into a plurality of signal intervals, and acquire per-signal-interval transmission times according to the counting unit provided from the I/O monitoring module IOM.

The I/O monitoring module IOM may provide the I/O rate controller 250 with a monitoring end signal for instructing the I/O monitor 251 to end monitoring. The I/O monitor 251 may end monitoring the signals transmitted between the PHYs and the nonvolatile memory device 100 according to the monitoring end signal provided from the I/O monitoring module TOM, calculate the per-signal-interval ratios, and then provide the calculated per-signal-interval ratios to the I/O balancer 255.

The I/O monitoring module TOM may provide a restart signal to the I/O rate controller 250. When the restart signal is provided from the I/O monitoring module TOM, the I/O monitor 251 may reset the per-signal-interval transmission times which have been acquired until the corresponding point of time, and acquire per-signal-interval transmission times by monitoring signals transmitted between the PHYs and the nonvolatile memory device 100 again from the corresponding point of time.

The I/O monitoring module TOM may request and receive the per-signal-interval transmission times from the I/O rate controller 250. The I/O monitoring module TOM may determine the aging state of the memory blocks included in the nonvolatile memory device 100, based on the per-signal-interval transmission times received from the I/O rate controller 250. For example, the I/O monitoring module TOM may determine that a memory block whose busy interval exceeds a threshold value is an aged memory block, and provide the bad block management module BBM with information for processing the corresponding memory block as a bad block. The bad block management module BBM may move data stored in the corresponding memory block into another memory block according to the information provided from the I/O monitoring module IOM, and then register and manage the corresponding memory block as a bad block.

The power management module PMM may check reserve power by comparing the total amount of power, which is currently used or consumed in the data storage device 10, to a set power budget. When the amount of power required for performing the next operation is larger than the reserve power, the power management module PMM may provide a data transfer rate decrease request signal to the I/O monitoring module TOM to reduce the current power consumption.

The I/O monitoring module IOM may receive the per-signal-interval transmission times from the I/O rate controller 250 according to the data transfer rate decrease request signal provided from the power management module PMM, and find the die whose operating time is the fastest, based on the received per-signal-interval transmission times. Furthermore, the I/O monitoring module TOM may control the I/O rate controller 250 to generate a control signal for lowering the data transfer rate between the corresponding die (i.e. the die whose operating time is the fastest) and the corresponding PHY, and to provide the generated control signal to the PHY controller 243.

The PHY controller 243 may provide the control signal for lowering the clock frequency to the PHY coupled to the die whose operating time is the fastest, according to the control signal provided from the I/O rate controller 250. By lowering the data transfer rate between the die whose operating time is the fastest and the corresponding PHY, the power consumed for data transmission may be reduced to increase the reserve power. FIG. 7 is a diagram illustrating an I/O monitoring setting register in accordance with an embodiment.

The I/O monitoring setting register illustrated in FIG. 7 may be included in the memory 230 (see FIG. 1), but the present embodiment is not specifically limited thereto. For example, the I/O monitoring setting register may include a start field, an end field, a restart field and a counting unit field. However, the configuration is only an embodiment. In general, the number and types of fields included in the I/O monitoring setting register are not limited to any specific configuration.

The start field may be set to a value indicating whether I/O monitoring is started. The end field may be set to a value indicating whether I/O monitoring is ended. The restart field may be set to a value indicating whether I/O monitoring is restarted. The counting unit field may be set to a value indicating the counting unit, i.e. the number of clock cycles by count. The values of the respective fields of the I/O monitoring setting register may be set by the I/O monitoring module IOM (see FIG. 6).

For example, the I/O monitoring module TOM may set the start field and the counting unit field of the I/O monitoring setting register to a value indicating a 'set' state and the value indicating the minimum number of clock cycles, respectively, and thus provide the monitoring start signal and the counting unit to the I/O rate controller 250. Furthermore, the I/O monitoring module TOM may set the end field of the I/O monitoring setting register to the value indicating the 'set' state, and thus provide the monitoring end signal to the I/O rate controller 250. Furthermore, the I/O monitoring module TOM may set the restart field of the I/O monitoring setting register to the value indicating the 'set' state, and thus provide the I/O rate controller 250 with a monitoring restart signal for ending monitoring which is being performed at the moment and restarting monitoring from the corresponding point of time.

Figure 8:
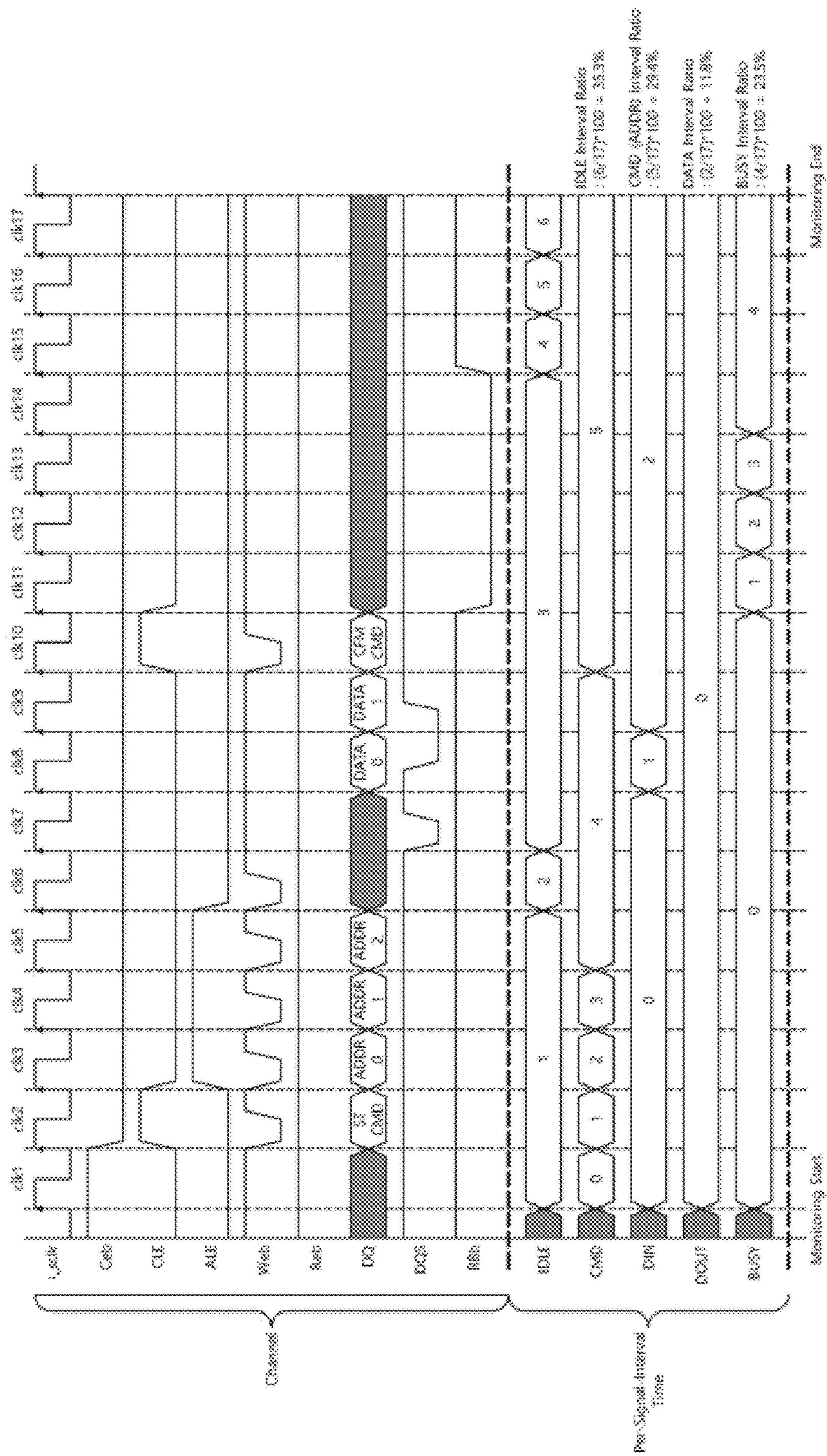
FIG. 8 is a diagram illustrating per-signal-interval counts and per-signal-interval ratios in accordance with an embodiment.

FIG. 8 is a diagram illustrating per-signal-interval counting and per-signal-interval ratios in accordance with an embodiment. By way of example, the counting unit is set to one clock cycle. Furthermore, the case in which a write operation is performed on a specific die (monitoring target die) among the plurality of dies included in the nonvolatile memory device 100 is described by way of example.

In FIG. 8, 'i_sclk' may represent a monitoring-only clock provided to monitor a signal transmitted between the monitoring target die and the corresponding PHY. Furthermore, 'Ceb', 'CLE', 'ALE', 'Web', 'Reb', 'DQ', 'DQS' and 'RBb' represent a chip enable signal, a command latch enable signal, an address latch enable signal, a write enable signal, a read enable signal, a data signal, a data strobe signal and a ready/busy signal, respectively.

The per-signal-interval counting for the monitoring target die may be performed based on the monitoring-only clock. The signal interval may include an idle interval IDLE, a command interval CMD, a data internal DIN/DOUT and a busy interval BUSY. The command interval CMD may include an interval in which a start command, an address and a confirm command are transmitted. The respective intervals may not overlap each other.

FIG. 8 shows that the total number of clock cycles from the point of time that monitoring is started to the point of time that monitoring is ended is '17'. Since no signals are transmitted for a time period corresponding to a first clock cycle clk1, the number of clock cycles in the idle interval IDLE may be counted as '1', and the number of clock cycles in the other intervals may be counted as '0'. Since a start command ST CMD and addresses ADDR0 to ADDR2 are transmitted for a time period corresponding to second to fifth clock cycles clk2 to clk5, the number of clock cycles in the idle interval IDLE may be retained as '1', the number of clock cycles in the command interval CMD may be counted as '4', and the number of clock cycles in the other intervals (data interval and busy interval) may be retained as '0'.

Then, since no signals are transmitted for a time period corresponding to sixth and seventh clock cycles clk6 and clk7, the number of clock cycles in the idle interval IDLE may be increased to '3', the number of clock cycles in the command interval CMD may be retained as '4', and the number of clock cycles in the other intervals (data interval and busy interval) may be retained as '0'.

Then, as data DATA0 and DATA1 are transmitted for a time period corresponding to eight and ninth cycles clk8 and clk9, the number of cycles in the data interval DIN may be counted as '2', the number of clock cycles in the idle interval IDLE and the number of clock cycles in the command interval CMD may be retained as '3' and '4', respectively, and the number of clock cycles in the other busy interval may be retained as '0'.

Then, as the confirm command CFM CMD is transmitted for a time period corresponding to a tenth clock cycle clk10, the number of clock cycles in the command interval CMD may be increased to '5', the number of clock cycles in the idle interval IDLE and the number of clock cycles in the data interval DIN may be retained as '3' and '2', respectively, and the number of clock cycles in the busy interval may be retained as '0'.

Then, as an operation corresponding to the command is performed in the monitoring target die for a time period corresponding to 11th to 14th clock cycles clk11 to clk14, the number of clock cycles in the busy interval BUSY may be counted as '4', the number of clock cycles in the idle interval IDLE, and the number of clock cycles in the command interval CMD and the number of clock cycles in the data interval DIN may be retained as '3', '5' and '2', respectively.

For a time period from a 15th clock cycle clk15, at which the monitoring target die is changed to 'ready state' from 'busy state' because the operation corresponding to the command is completed in the monitoring target die, to a 17th clock cycle clk17 at which monitoring is ended, the number of clock cycles in the idle interval IDLE may be increased to '6', and the number of clock cycles in the command interval CMD, the number of clock cycles in the data interval DIN and the number of clock cycles in the busy interval BUSY may be retained as '5', '2' and '4', respectively.

Thus, the idle interval time, the command interval time, the data interval time and the busy interval time, which are acquired for the monitoring target die through the monitoring, are '6', '5', '2' and '4', respectively. FIG. 8 illustrates the per-signal-interval ratios calculated through the entire monitoring time and the acquired per-signal-interval times. Each of the ratios is with reference to the total number of clock cycles, e.g., 17 in the embodiment of FIG. 8.

As described above, FIG. 8 illustrates an example of the monitoring operation for one die, and the per-signal-interval ratios may be obtained by performing monitoring on each of the dies through the same method. When the per-signal-interval ratios are acquired for each of the dies, the die whose operating time is the slowest and the die whose operating time is the fastest may be found based on the ratio of the busy interval BUSY.

Figure 9:
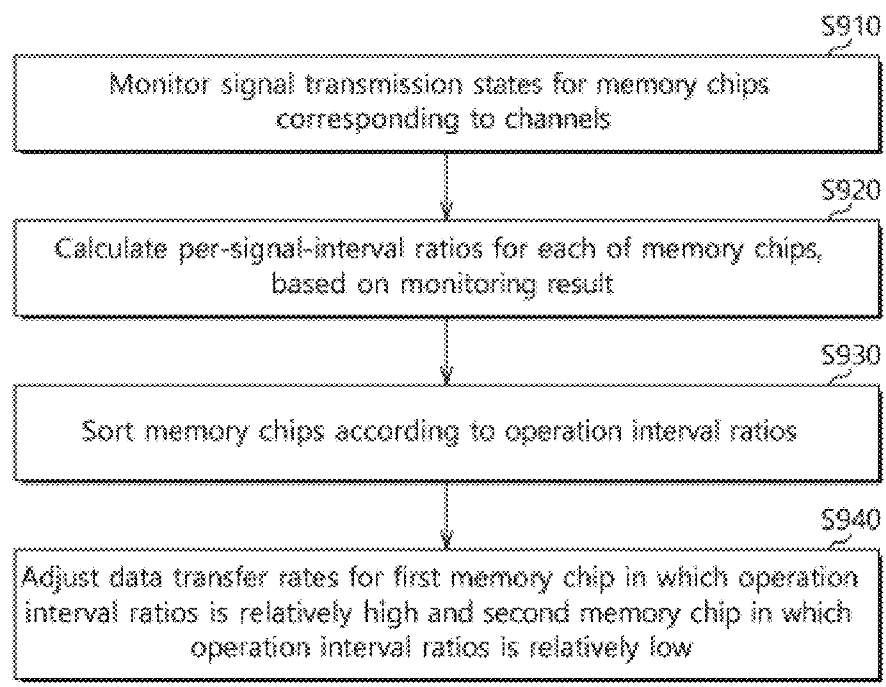
FIG. 9 is a flowchart illustrating an operating method of a data storage device in accordance with an embodiment.

FIG. 9 is a flowchart illustrating an operating method of a data storage device in accordance with an embodiment. While such operating method is described with reference to FIG. 9, one or more of FIGS. 1 to 8 may be referred to.

In step S910, the controller 200 may monitor signal transmission states for the plurality of memory chips or dies in the nonvolatile memory device 100. For example, the monitoring of the signal transmission states for the plurality of memory chips or dies may be performed by the I/O rate controller 250 in the memory interface 240 of the controller 200.

The I/O rate controller 250 may monitor the signal transmission states for the memory chips through the plurality of channels coupled to the respective memory chips. For example, the I/O rate controller 250 may monitor the signal transmission states for the memory chips by snooping signals transferred on the respective channels CH1 to CHn through the monitoring lines 260 operably coupled to the respective channels CH1 to CHn.

In step S920, the I/O rate controller 250 may calculate per-signal-interval ratios for each of the memory chips, based on the monitored signal transmission states for the respective memory chips. For example, the signal interval may include an idle interval, a command interval, a data interval and a busy interval, but the present invention is not specifically limited to those intervals. The command interval may include intervals in which a start command, an address and a confirm command are transmitted. The data interval may include both a data input interval in which data is transmitted to a memory chip and a data output interval in which data is received from a memory chip. The busy interval in which an operation corresponding to the command received by the memory chip is performed may be referred to as an operation interval.

The per-signal-interval ratios for each of the memory chips may be calculated through the entire monitoring time and the per-signal-interval times. Since the process has been described above in detail, such description is omitted here.

In step S930, the I/O rate controller 250 may sort the plurality of memory chips according to their busy interval ratios or operation interval ratios. For example, the I/O rate controller 250 may sort the plurality of memory chips in descending or ascending order of the busy interval ratios.

In step S940, the I/O rate controller 250 may select a first memory chip in which the busy interval ratio or the operation interval ratio is relatively high and a second memory chip in which the busy interval ratio or the operation interval ratio is relatively low, and adjust data interval ratios for each of the selected first and second memory chips. The first memory chip in which the busy interval ratio is relatively high may be the memory chip in which the busy interval ratio is the highest, but the present embodiment is not specifically limited thereto. Similarly, the second memory chip in which the busy interval ratio is relatively low may be the memory chip in which the busy interval ratio is the lowest, but the present embodiment is not specifically limited thereto.

When the busy interval ratio is high, it may indicate that the operating time is long. Thus, the first memory chip in which the busy interval ratio is high may be a memory chip whose operating time is slow. Furthermore, when the busy interval ratio is low, it may indicate that the operating time is short. Thus, the second memory chip in which the busy interval ratio is low may be a memory chip whose operating time is fast. In order to balance the performances of the first and second memory chips, the I/O rate controller 250 may raise the data transfer rate for the first memory chip, and lower the data transfer rate for the second memory chip. Accordingly, the data interval ratio among the per-signal-interval ratios for the first memory chip may be lowered and the data interval ratio among the per-signal-interval ratios for the second memory chip may be raised.

The operations illustrated in FIG. 9 may be automatically performed after the data storage device 10 is powered on, without an intervention of the firmware configured to perform I/O rate control, i.e. the I/O monitoring module IOM. That is, when the data storage device 10 is powered on, the I/O rate controller 250 of the controller 200 may monitor the signal transmission states for the respective memory chips of the nonvolatile memory device 100 in real time, and adjust the data transfer rates of the memory chip whose operating time is slow and the memory chip whose operating time is fast.

The I/O rate controller 250 of the controller 200 may be operated under control of the I/O monitoring module IOM. This process will be described with reference to FIG. 10.

Figure 10:
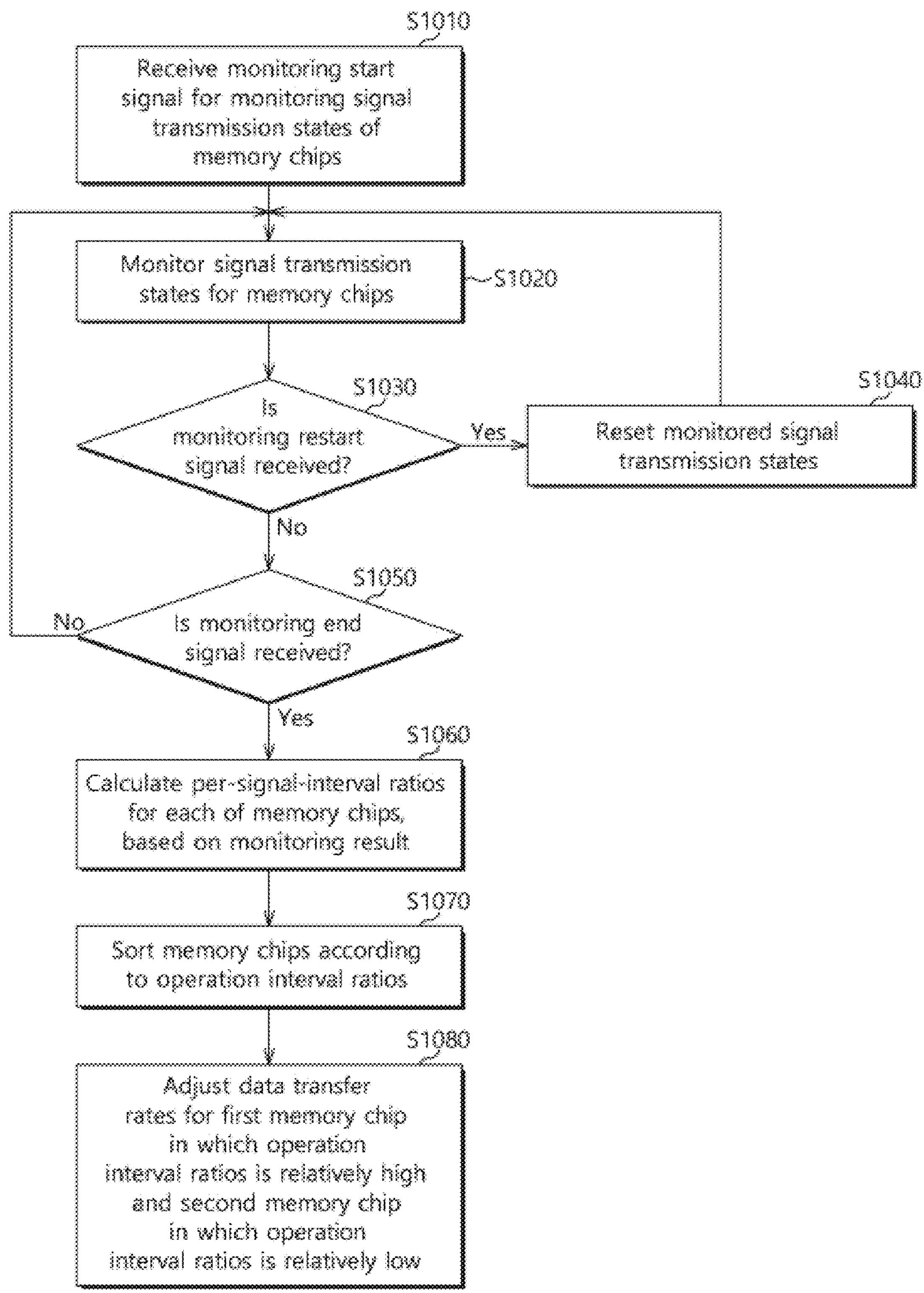
FIG. 10 is a flowchart illustrating an operating method of a data storage device in accordance with an embodiment.

FIG. 10 is a flowchart illustrating an operating method of a data storage device in accordance with an embodiment. While such operating method is described with reference to FIG. 10, one or more of FIGS. 1 to 8 may be referred to. Furthermore, when the operating method of the data storage device in accordance with the present embodiment is described with reference to FIG. 10, detailed description of operations already described with respect to FIG. 9 are omitted here.

In step S1010, the processor 220 of the controller 200 may execute the I/O monitoring module IOM. The I/O monitoring module IOM executed by the processor 220 may set the start field of the I/O monitoring setting register to the 'set' state. Thus, the I/O rate controller 250 may receive the monitoring start signal. The I/O rate controller 250 may receive the counting unit with the monitoring start signal.

In step S1020, the I/O rate controller 250 may monitor the signal transmission states for the respective memory chips according to the monitoring start signal.

In step S1030, the I/O rate controller 250 may determine whether the monitoring restart signal is received from the I/O monitoring module IOM. When the monitoring restart signal is received, the process may proceed to step S1040. When the monitoring restart signal is not received, the process may proceed to step S1050.

In step S1040, the I/O rate controller 250 may reset the signal transmission states for the respective memory chips, which have been monitored until the monitoring restart signal is received. Then, the process may return to step S1020 to monitor the signal transmission states of the respective memory chips from the corresponding point of time.

In step S1050, the I/O rate controller 250 may determine whether the monitoring end signal is received from the I/O monitoring module IOM. When the monitoring end signal is received, the process may proceed to step S1060. When the monitoring end signal is not received, the process may return to step S1020.

In step S1060, the I/O rate controller 250 may calculate the per-signal-interval ratios for each of the memory chips, based on the monitored signal transmission states for the respective memory chips.

In step S1070, the I/O rate controller 250 may sort the plurality of memory chips according to their busy interval ratios or their operation interval ratios.

In step S1080, the I/O rate controller 250 may select a first memory chip in which the busy interval ratio or the operation interval ratio is relatively high and a second memory chip in which the busy interval ratio or the operation interval ratio is relatively low, and adjust data interval ratios for each of the selected first and second memory chips.

In accordance with embodiments, since data transfer rates for dies having different operating times can be adjusted, the performance of the dies can be balanced to improve the performance of the data storage device.

Furthermore, the data transfer rate for a die whose operating time is fast may be lowered to secure reserve power, which makes it possible to prevent performance degradation due to a power shortage.

Figure 11:
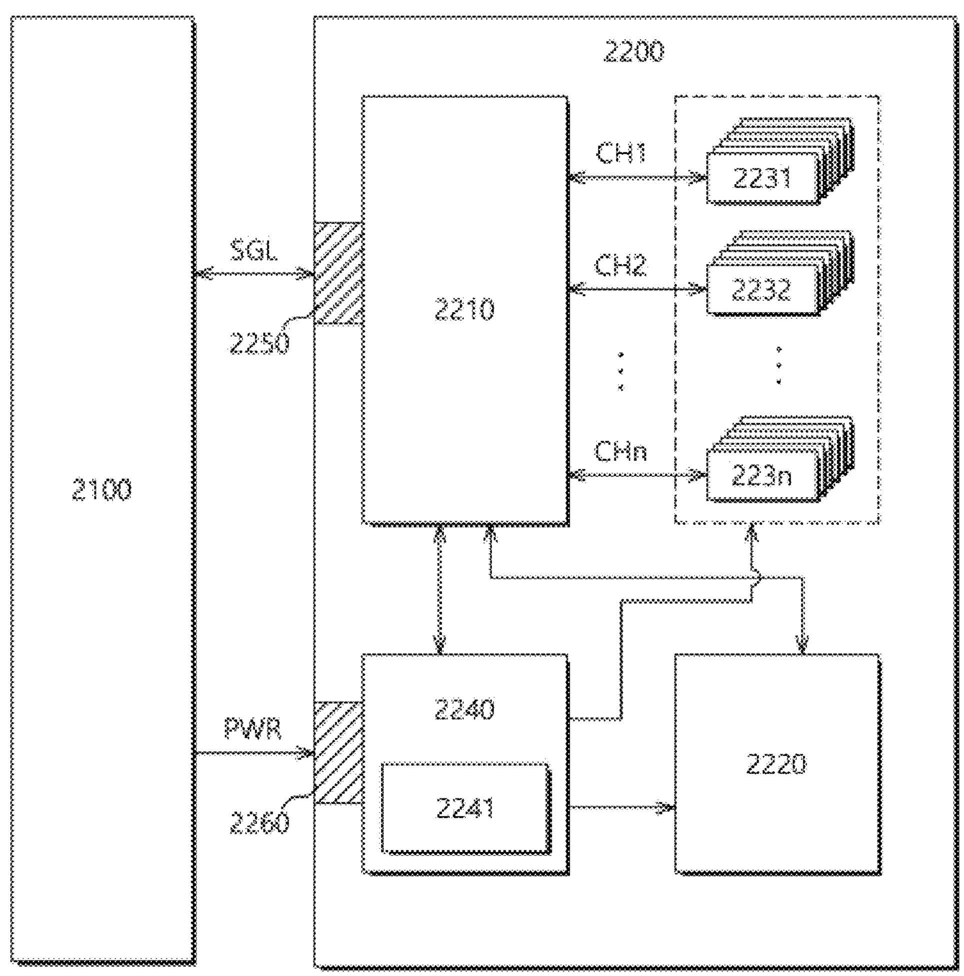
FIG. 11 is a diagram illustrating a data processing system including a solid state drive (SSD) in accordance with an embodiment.

FIG. 11 illustrates a data processing system including a solid state drive (SSD) in accordance with an embodiment. Referring to FIG. 11, a data processing system 2000 may include a host apparatus 2100 and an SSD 2200.

The SSD 2200 may include a controller 2210, a buffer memory device 2220, nonvolatile memory devices 2231 to **223*n*, a power supply 2240, a signal connector 2250, and a power connector 2260**.

The controller 2210 may control overall operation of the SSD 2220.

The buffer memory device 2220 may temporarily store data to be stored in the nonvolatile memory devices 2231 to **223*n*. The buffer memory device 2220 may temporarily store data read from the nonvolatile memory devices 2231 to 223*n*. The data temporarily stored in the buffer memory device 2220 may be transmitted to the host apparatus 2100 or the nonvolatile memory devices 2231 to 223*n* according to control of the controller 2210**.

The nonvolatile memory devices 2231 to **223*n* may be used as a storage medium of the SSD 2200. The nonvolatile memory devices 2231 to 223*n* may be coupled to the controller 2210 through a plurality of channels CH1** to CHn. One or more nonvolatile memory devices may be coupled to one channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 12:
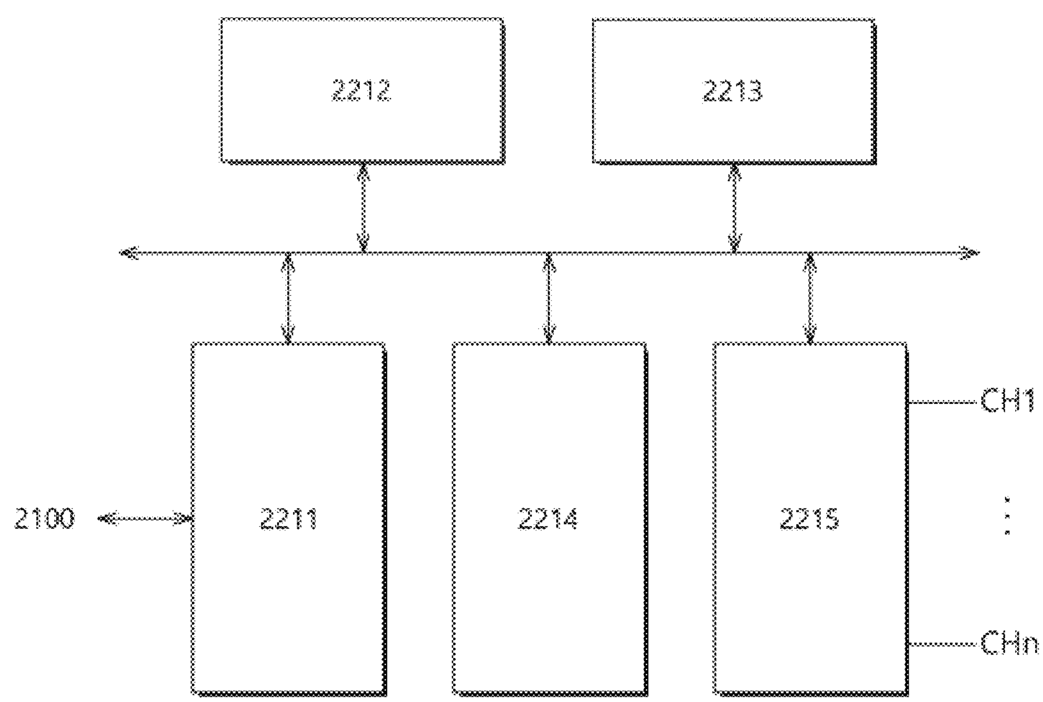
FIG. 12 is a diagram illustrating a controller, such as that illustrated in FIG. 11.

FIG. 12 illustrates the controller 2210 of FIG. 11. Referring to FIG. 12, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to **223*n*. The generated parity data may be stored in the nonvolatile memory devices 2231 to 223*n* together with the data. The ECC component 2214 may detect errors for data read from the nonvolatile memory devices 2231 to 223*n* based on the parity data. When detected errors are within a correctable range, the ECC component 2214** may correct the detected errors.

The memory interface 2215 may provide a control signal such as a command and an address to the nonvolatile memory devices 2231 to **223*n* according to control of the control component 2212. The memory interface 2215 may exchange data with the nonvolatile memory devices 2231 to 223*n* according to control of the control component 2212. For example, the memory interface 2215 may provide data stored in the buffer memory device 2220 to the nonvolatile memory devices 2231 to 223*n* or provide data read from the nonvolatile memory devices 2231 to 223*n* to the buffer memory device 2220**.

Figure 13:
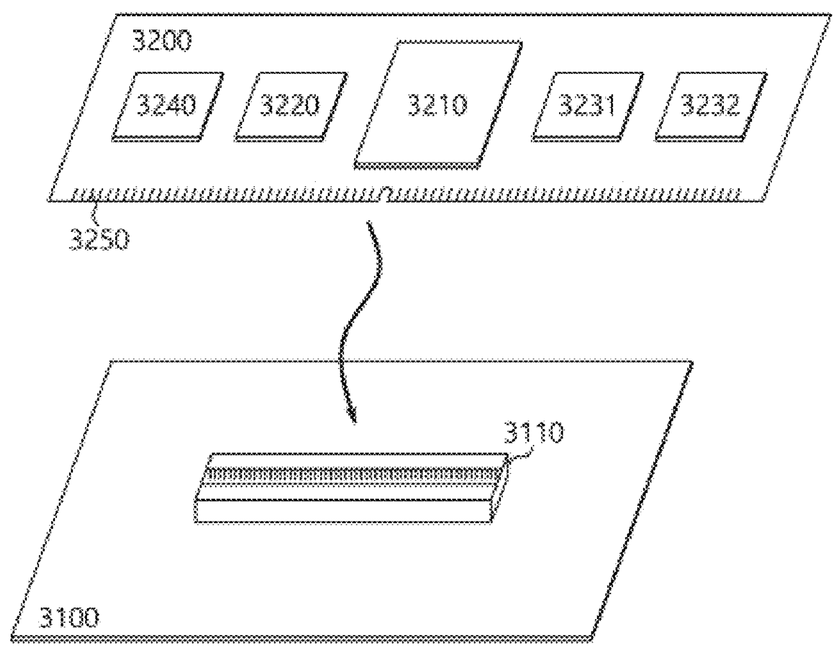
FIG. 13 is a diagram illustrating a data processing system including a data storage apparatus in accordance with an embodiment.

FIG. 13 illustrates a data processing system including a data storage apparatus in accordance with an embodiment. Referring to FIG. 13, a data processing system 3000 may include a host apparatus 3100 and a data storage apparatus 3200.

The host apparatus 3100 may be configured in a board form such as a printed circuit board (PCB). Although not shown in FIG. 13, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured to have the same configuration as the controller 2210 illustrated in FIG. 12.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in any of various forms according to an interfacing method between the host apparatus 3100 and the data storage apparatus 3200. The connection terminal 3250 may be arranged in or on any side of the data storage apparatus 3200.

Figure 14:
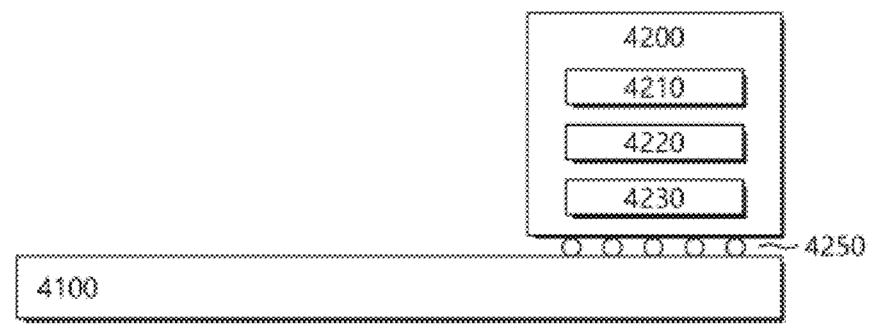
FIG. 14 is a diagram illustrating a data processing system including a data storage apparatus in accordance with an embodiment.

FIG. 14 illustrates a data processing system including a data storage apparatus in accordance with an embodiment. Referring to FIG. 14, a data processing system 4000 may include a host apparatus 4100 and a data storage apparatus 4200.

The host apparatus 4100 may be configured in a board form such as a PCB. Although not shown in FIG. 14, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same as the controller 2210 illustrated in FIG. 12.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 15:
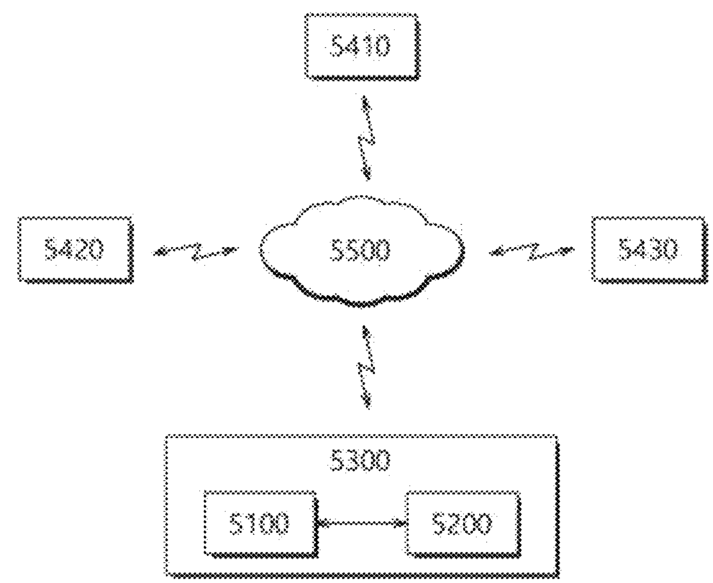
FIG. 15 is a diagram illustrating a network system including a data storage apparatus in accordance with an embodiment.

FIG. 15 illustrates a network system 5000 including a data storage apparatus in accordance with an embodiment. Referring to FIG. 15, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured as the data storage device 10 of FIG. 1, the SSD 2200 of FIG. 12, the data storage apparatus 3200 of FIG. 13, or the data storage apparatus 4200 of FIG. 14.

Figure 16:
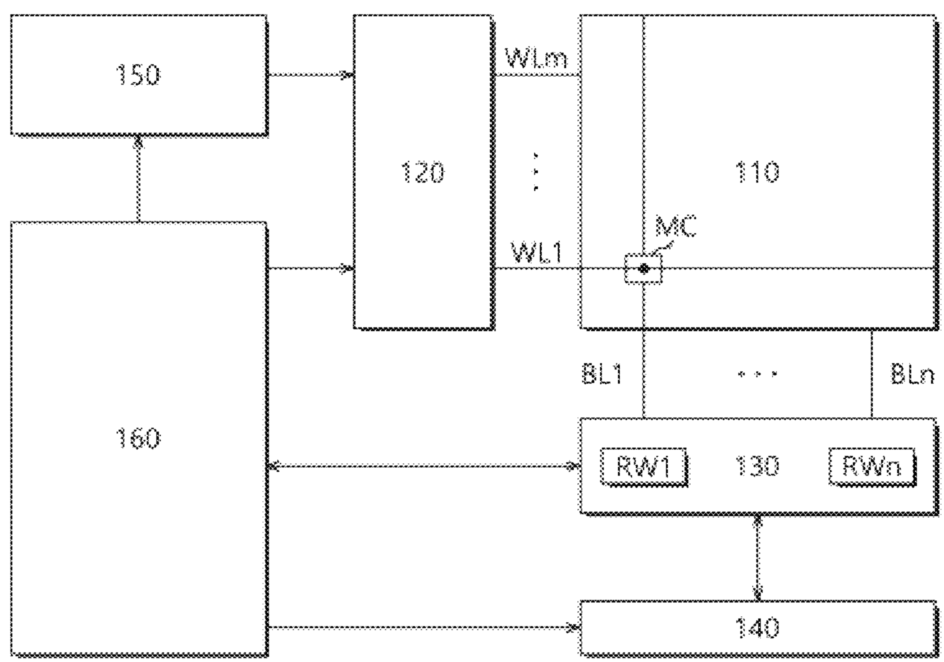
FIG. 16 is a diagram illustrating a nonvolatile memory device included in a data storage apparatus in accordance with an embodiment.

FIG. 16 illustrates a nonvolatile memory device included in a data storage apparatus in accordance with an embodiment. Referring to FIG. 16, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions in which word lines WL1 to WLm and bit lines BL1 to BLn cross each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above and illustrated in the accompanying drawings, it will be understood to those skilled in the art that the embodiments described are examples only. Accordingly, the present invention is not limited by or to the described embodiments. Rather, the present invention encompasses all variations and modifications of any of the disclosed embodiments that fall within the scope of the claims.

What is claimed is:

1. A memory interface circuit for interfacing a control circuit and a memory device including a plurality of dies, the memory interface circuit comprising:

a transceiver circuit configured to exchange signals with the plurality of dies; and an input/output (I/O) rate control circuit configured to:

calculate per-signal-interval ratios of each of the dies by monitoring signals transmitted to, and received from, each of the dies, select a first die and a second die among the plurality of dies, using the calculated per-signal-interval ratios, wherein operating time of the first die is slower than operating time of the second die, and provide the transceiver circuit with information for adjusting data interval ratios for each of the first and second dies.

2. The memory interface circuit according to claim 1, wherein the transceiver circuit exchanges signals with the plurality of dies through channels corresponding to the respective dies.

3. The memory interface circuit according to claim 2, wherein the I/O rate control circuit monitors signals transmitted to, and received from, the plurality of dies through monitoring lines operably coupled to the respective channels.

4. The memory interface circuit according to claim 1, wherein the signal interval comprises an idle interval in which no signals are transmitted/received, a command interval in which a command and address are transmitted, a data interval in which data is transmitted/received, and a busy interval in which an operation corresponding to the command is performed.

5. The memory interface circuit according to claim 1, wherein the I/O rate control circuit calculates the per-signal-interval ratios using the entire monitoring time and per-signal-interval times for each of the dies.

6. The memory interface circuit according to claim 1, wherein the I/O rate control circuit provides the transceiver circuit with information for increasing the data transfer rate for the first die and decreasing the data transfer rate for the second die.

7. The memory interface circuit according to claim 1, wherein the I/O rate control circuit starts monitoring signals transmitted to, and received from, the plurality of dies, respectively, according to a monitoring start signal received from an external source, and calculates the per-signal-interval ratios using the monitored signals according to a monitoring end signal received from the external source.

8. The memory interface circuit according to claim 1, wherein the transceiver circuit comprises a plurality of physical layers configured to transmit signals to the plurality of dies and receive signals from the plurality of dies, respectively, and a physical layer control circuit configured to control operations of the physical layers, wherein the physical layer control circuit transmits a control signal for adjusting a clock frequency to first and second physical layers corresponding to the first and second dies, respectively, among the plurality of physical layers, according to the information provided from the I/O rate control circuit.

9. A data storage device comprising:

a nonvolatile memory device comprising a plurality of memory chips; and a control circuit configured to:

calculate per-signal-interval ratios of each of the memory chips by monitoring signals transmitted to, and received from, the plurality of memory chips, respectively, select a first memory chip whose operating time is the slowest and a second memory chip whose operating time is the fastest, among the plurality of memory chips, using the calculated per-signal-interval ratios, and adjust data interval ratios for each of the first and second memory chips.

10. The data storage device according to claim 9, wherein the control circuit adjusts data interval ratios to increase data transfer rate for the first memory chip and to decrease data transfer rate for the second memory chip.

11. The data storage device according to claim 9, wherein the control circuit comprises:

a memory interface configured to interface the nonvolatile memory device and the control circuit; and a processor configured to control overall operations of the control circuit.

12. The data storage device according to claim 11, wherein the memory interface comprises:

a plurality of physical layers configured to exchange signals with the plurality of memory chips, respectively;

a physical layer control circuit configured to control operations of the respective physical layers; and an I/O rate control circuit configured to:

calculate the per-signal-interval ratios by monitoring the signals exchanged with the memory chips, select the first and second memory chips using the per-signal-interval ratios, and provide the physical layer control circuit with information for adjusting the data interval ratios for each of the first and second memory chips.

13. The data storage device according to claim 12, wherein the control circuit further comprises a memory configured to store an I/O monitoring module which is a group of source codes for operating the I/O rate control circuit.

14. The data storage device according to claim 13, wherein the I/O monitoring module is executed by the processor, and provides the I/O rate control circuit with a monitoring start signal, a monitoring end signal, a monitoring restart signal and a counting unit.

15. The data storage device according to claim 14, wherein when the monitoring start signal and the counting unit are provided from the I/O monitoring module, the I/O rate control circuit starts monitoring the signals transmitted to, and received from, the respective memory chips, and increases per-signal-interval counts according to the counting unit.

16. The data storage device according to claim 15, wherein the counting unit is a set number of clock cycles.

17. The data storage device according to claim 15, wherein when the monitoring end signal is provided from the I/O monitoring module, the I/O rate control circuit calculates the per-signal-interval ratios for each of the memory chips using the monitored signals for the plurality of memory chips, selects the first and second memory chips, and provides the physical layer control circuit with information for adjusting the data interval ratios for each of the first and second memory chips.

18. The data storage device according to claim 15, wherein when the monitoring restart signal is provided from the I/O monitoring module, the I/O rate control circuit resets the monitored signals for the plurality of memory chips, and restarts monitoring signals transmitted to, and received from, the respective memory chips.

19. The data storage device according to claim 13, wherein the memory further comprises a power management module configured to manage power used in the data storage device, wherein the power management module provides the I/O monitoring module with a data transfer rate decrease request signal for reducing power consumption, when reserve power is low.

20. The data storage device according to claim 19, wherein the I/O monitoring module controls the I/O rate control circuit to lower data transfer rate of the memory chip whose operating speed is the fastest, among the plurality of memory chips, in response to the data transfer rate decrease request signal provided from the power management module.

21. An operating method of a control circuit for controlling a memory device including plural chips operably coupled to the control circuit through respective channels, the operating method comprising:

identifying busy intervals of the respective chips by snooping signals transferred through the channels for a set time interval; and performing a signal transfer rate adjusting operation of increasing a signal transfer rate of a first channel coupled to a first chip and decreasing a signal transfer rate of a second channel coupled to a second chip, when a busy interval of the first chip is longer than a busy interval of the second chip, among the channels.

* * * * *